US009324216B2

(12) United States Patent
Janosov

(10) Patent No.: US 9,324,216 B2
(45) Date of Patent: Apr. 26, 2016

(54) PATTERN MATCHING SLOT MECHANIC

(71) Applicant: Blue Crystal Labs, San Francisco, CA (US)

(72) Inventor: Jesse Janosov, San Francisco, CA (US)

(73) Assignee: Blue Crystal Labs, San Francisco, CA (US)

( * ) Notice: Subject to any disclaimer, the term of this patent is extended or adjusted under 35 U.S.C. 154(b) by 107 days.

(21) Appl. No.: 14/215,501

(22) Filed: Mar. 17, 2014

(65) Prior Publication Data

US 2015/0221165 A1 Aug. 6, 2015

Related U.S. Application Data

(60) Provisional application No. 61/935,060, filed on Feb. 3, 2014.

(51) Int. Cl.
*A63F 13/00* (2014.01)
*G07F 17/34* (2006.01)

(52) U.S. Cl.
CPC .................................... *G07F 17/34* (2013.01)

(58) Field of Classification Search
CPC ......................... G07F 17/3206; G07F 17/3209
USPC ................................................. 463/9, 20, 31
See application file for complete search history.

(56) References Cited

U.S. PATENT DOCUMENTS

| | | | | |
|---|---|---|---|---|
| 4,207,087 | A * | 6/1980 | Morrison et al. | 463/9 |
| 5,135,224 | A * | 8/1992 | Yamamoto et al. | 463/20 |
| 2003/0027619 | A1* | 2/2003 | Nicastro, Sr. | 463/16 |
| 2003/0224850 | A1 | 12/2003 | Anderson et al. | |
| 2005/0233792 | A1* | 10/2005 | Rehkemper et al. | 463/9 |
| 2009/0247276 | A1 | 10/2009 | Okada | |
| 2010/0052253 | A1* | 3/2010 | Macura et al. | 273/237 |
| 2010/0197398 | A1* | 8/2010 | Masuda et al. | 463/31 |
| 2013/0023328 | A1 | 1/2013 | Saunders | |

FOREIGN PATENT DOCUMENTS

| | | |
|---|---|---|
| JP | 07313728 | 5/1995 |

* cited by examiner

*Primary Examiner* — James S McClellan

(74) *Attorney, Agent, or Firm* — Scheinberg & Associates, PC; Michael O. Scheinberg; John B. Kelly

(57) ABSTRACT

A pattern matching mechanic for touch screen slot machines. A pattern consisting of a sequence of randomly selected cells in a displayed symbol matrix is generated and momentarily displayed to a player as their spin is ending. The sequence can be displayed whether the spin is lost or won. A player sequence is received and compared to the pattern. A reward is provided to the player if the player sequence matches the pattern sequence. The pattern sequence can be generated with a cadence that must be matched by the player sequence. The pattern can be generated at different levels, and the reward based on the level of the pattern generated. The level can be increased when a number of consecutive patterns are matched, and decreased when a number of consecutive patterns are not matched.

4 Claims, 5 Drawing Sheets

PATTERN MATCHING SLOT MECHANIC

RELATED APPLICATION

This application claims priority to U.S. Provisional Patent Application Ser. No. 61/935,030, filed on Feb. 3, 2014, entitled "Rhythm Reels," which is herein incorporated by reference in its entirety.

TECHNICAL FIELD OF THE INVENTION

The present invention relates to a mechanic for slot machines, and in particular to a pattern matching mechanic for touch screen display slot machines.

BACKGROUND OF THE INVENTION

Slot machines are games of chance. Mechanical slot machines consist of a series of wheels with a plurality of different symbols on each wheel. Various symbols can be used, and typical symbols include lemons, cherries, the number 7 and the word "bar." A bet is placed, and the wheels are spun. The wheels eventually come to rest, and when they do, a sequence of symbols are displayed on a series of lines, at least one of which is a payout line. If the sequence of symbols on the payout line matches a payout sequence, the bet is paid off based on the odds of the wheels landing on that particular payout sequence in the payout line. If the sequence of symbols on the payout line does not match a payout sequence, the bet is lost. Different payout sequences are possible, and when the payout line matches any particular payout sequence, the bet is paid off according to the odds of matching that payout sequence.

In some modern slot machines, the mechanical wheels have been replaced with a computer generated matrix that emulates the behavior of the mechanical wheels. A bet is placed, and the "wheels" are spun. A matrix of symbols is displayed on a display device to indicate the position of the "wheels" when they stop. These virtual "wheels" can stop at the same time, in a particular order (e.g., left to right), or in a random order. If a row of the matrix corresponding to the payout line displays a sequence of symbols that matches a payout sequence, the bet is paid off as before. If the sequence of symbols in the payout row does not match a payout sequence, the bet is lost.

In many modern slot machines, the display device is a touch screen display that includes control icons that allow a user to control the action of the machine. The display can include an icon that indicates the amount of money or credits in the slot machine, an icon control for receiving user input indicating the size of the bet to be placed on the next spin, an icon showing the amount paid out on a previously won bet, and a control icon to place the bet by starting the emulated spin of the "wheels."

Slot machines can be implemented in many different forms, and the bets placed and the amounts won can likewise take different forms. For example, in jurisdictions that allow gambling, slot machines can be implemented to receive and pay off bets in the form of real money (either directly in the form of currency, or indirectly via tokens or credits that can be purchased and redeemed, or credit or debit or smart card transactions). In jurisdictions that do not allow gambling, slot machines can be implemented to allow the purchase of a number of playing credits, and pay off bets in the form of additional credits for continued playing time or a cumulative score to indicate a player's success. In addition, slot machines can be implemented as games to be played on a computer, game console or device, tablet, smart phone, or any such other viable platform or device. In such games, a number of playing credits might be provided for free, or credits might be made available for purchase, and the bets paid out in terms of additional playing credits or a cumulative score indicating the player's success at the machine.

Many slot machine features can be made variable. For example, the number of wheels on a slot machine, whether real or virtual, can be variable. Typically, a slot machine will have between three and five wheels, but fewer or more wheels are possible. Similarly, the number of lines displayed when the wheels come to rest can be variable. While three lines are typically shown, fewer or more lines can be shown. Likewise, the number of payout lines on the slot machine can be made variable, and the payout lines can run horizontally, vertically or diagonally across the matrix of symbol displayed. Moreover, the slot machine can have a payout pattern (e.g., a matching corners pattern) rather than or in addition to payout lines. Other variable features can include, but are not limited to, the number and types of symbols displayed on each wheel of the slot machine, the number of payout sequences, the particular symbol sequence for each payout sequence, the odds of the wheels landing so that the symbols on the payout line match a payout sequence, and the size of the payouts for a payout sequence. In addition, the wheels of the slot machine, when spun, can come to rest at the same time, in a particular order (e.g., left to right) or in a random order.

While slot machines have proven to be a popular form of entertainment or gambling, many users quickly tire of the game due to the limited amount of user interaction required to play. A slot machine mechanic is therefore proposed and described to increase the amount of user interaction with the slot machine, thereby increasing the user's enjoyment in playing the machine and the amount of time the user will remain engaged in play on the machine.

SUMMARY OF THE INVENTION

An object of the invention is to provide a pattern matching mechanic for a slot machine. The mechanic displays a pattern matching sequence to a player of the slot machine between the time the first spin starts and before the next spin starts. The pattern matching sequence corresponds to a random sequence of cells in a symbol matrix displayed on a display device of the slot machine. The slot machine mechanic receives a player generated input sequence corresponding to a sequence of cells in the symbol matrix selected by the player. The slot machine mechanic determines whether the player generated input sequence matches the pattern matching sequence, and provides the player with a reward if the player generated input sequence matches the pattern matching sequence.

The pattern matching sequence can be displayed to the player by highlighting each cell in the pattern matching sequence. Cells in the pattern matching sequence can be highlighted by flashing each cell on and off, dimming and brightening each cell, superimposing an element of an alphanumerical sequence over the image in each cell, or highlighting the border of each cell. Each cell in the pattern matching sequence can be sequentially highlighted for a period of time.

The pattern matching sequence can be provided with a cadence, and can be displayed according to its cadence. Receiving the player generated input sequence can include measuring the cadence of the received player generated input sequence. Determining whether the player generated input sequence matches the pattern matching sequence can include determining whether the measured cadence of the player generated input sequence matches the cadence of the pattern matching sequence.

Determining whether the player generated input sequence matches the pattern matching sequence can also include measuring a period of time between displaying the pattern matching sequence to the player and receiving the player generated input sequence. The player generated input sequence can be considered to not match the pattern matching sequence if the period of time exceeds a first time threshold. Determining whether the player generated input sequence matches the pattern matching sequence can also include measuring a period of time during which the player generated input sequence is received. The player generated input sequence can be considered to not match the pattern matching sequence if the period of time exceeds a second time threshold.

The displayed pattern matching sequence can be generated according to a level of play. If the player generated input sequence matches the pattern matching sequence, the reward can be based on the level of play at which the pattern matching sequence was generated. The level of play can be decreased if the player generated input sequence does not match the pattern matching sequence. The level of play can be decreased by determining a consecutive number of failed plays in which the player generated input sequence did not match the pattern matching sequence. The level of play can be decreased if the consecutive number of failed plays is greater than a first play threshold. The level of play can be increased if the player generated input sequence matches the pattern matching sequence. The level of play can be increased by determining a consecutive number of plays in which the player generated input sequence matched the pattern matching sequence. The level of play can be increased if the consecutive number of plays is greater than a second play threshold.

The reward provided if the player generated input sequence matches the pattern matching sequence can include casino comp time, enhanced casino comp time, experience points, bonus points, extended play, free spin(s), credits in the form wagered currency whether virtual or real currency, a multiplier that could be applied to a winning symbol combination from a winning spin, or eligibility to a random bonus drawing for one or more reward elements. The reward can also include deleting a cell from the displayed symbol matrix, and moving a cell immediately above the deleted cell down in the displayed symbol matrix to generate a new symbol matrix. If a sequence of symbols in the new symbol matrix matches a payout sequence in the pay table of the slot machine, the bet wagered on the spin of the slot machine can be paid. The reward can be selectively granted based on the level of play. In this regard, the reward can only be granted when the user reaches a certain level of play, or when the user remains at a certain level of play for more than a predetermined number of spins.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Figure 1A:
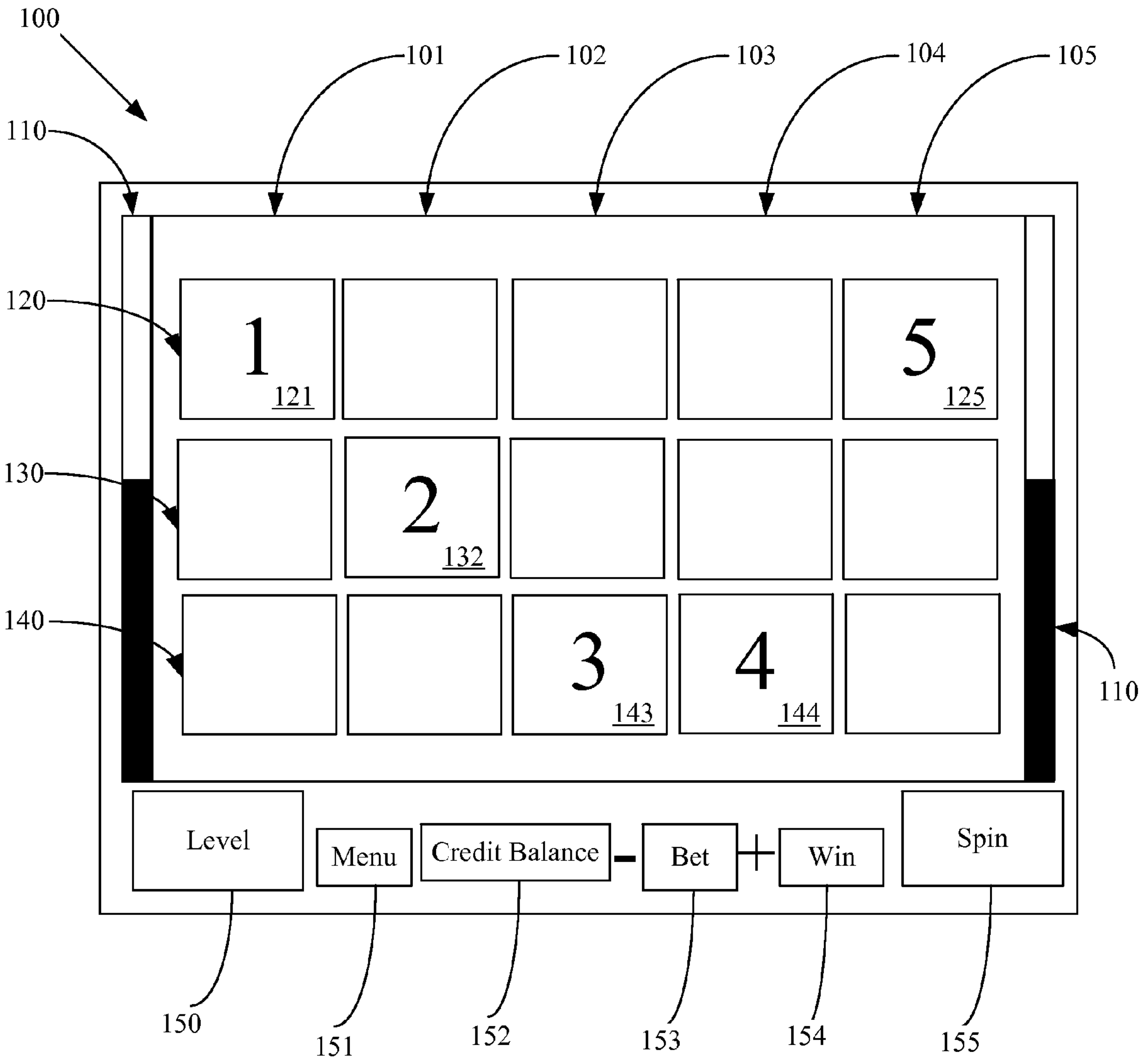
FIG. 1A is an illustration of a touch screen display on a slot machine showing a first aspect of a pattern matching mechanic.

FIG. 1A is an illustration of a touch screen display on a slot machine showing a first aspect of a pattern matching mechanic. The pattern matching mechanic can be implemented based on computer readable instructions performed by a computer processor in an electronic slot machine such as that shown in FIG. 3. The computer readable instructions can implement a computer algorithm such as that shown in FIG. 2. Numerous aspects and variations of a pattern matching mechanic are described below in reference to FIGS. 1A-1C, 2 and 3.

FIG. 1A illustrates a slot machine touch screen display 100. The display includes a number of icons such as a menu icon 151 to select a particular game, style or mode of play, a level icon 150 to indicate or select a level of play, a credit balance icon 152 to indicate a current balance, a bet icon 153 to enter a desired bet amount up to and including the credit balance or a maximum allowed bet, a win icon 154 to indicate a payout amount in the event of a winning spin, and a spin icon 155 to place a bet and start a round of play.

Figure 2:
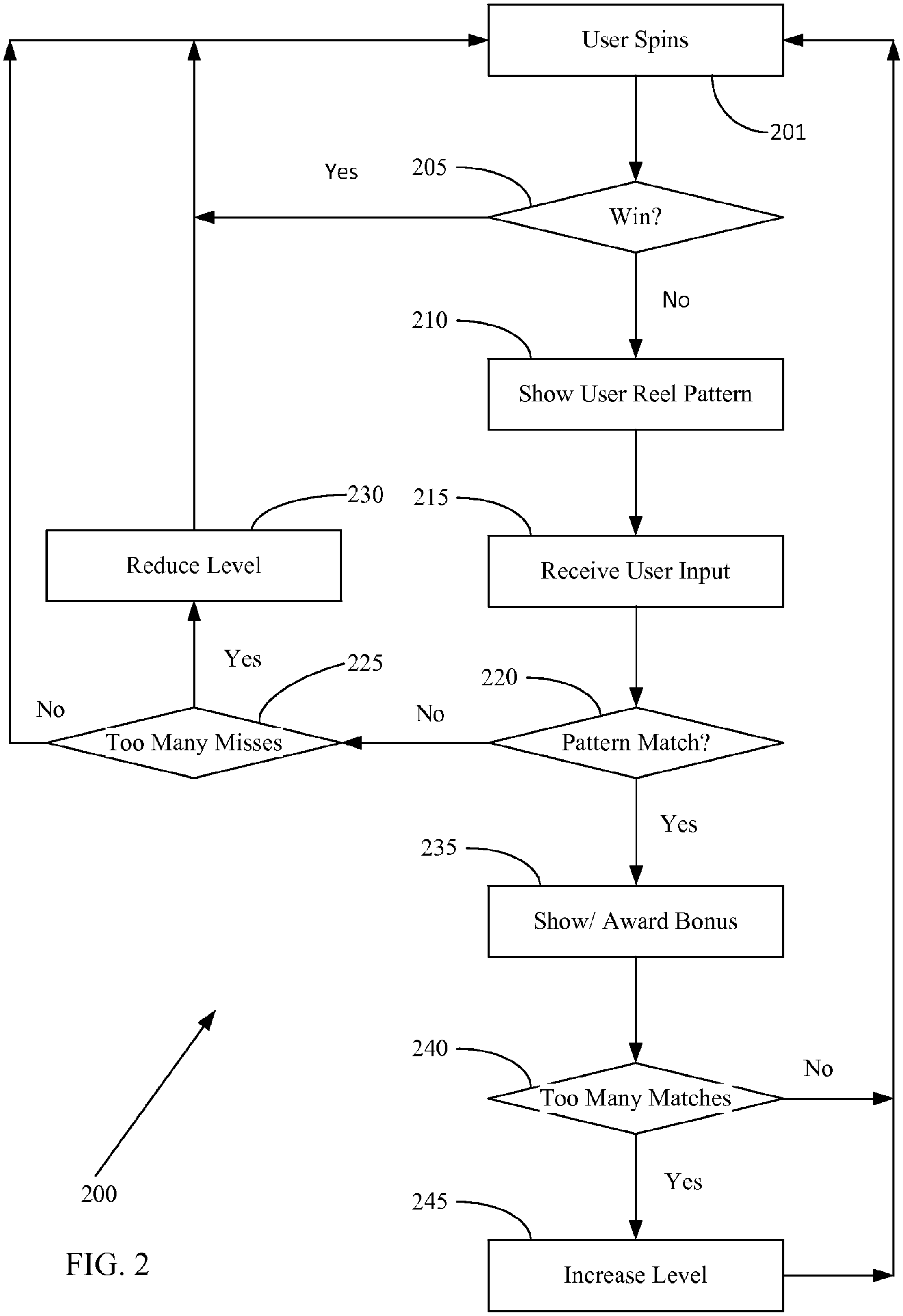
FIG. 2 is a flow chart depicting a method for implementing a pattern matching mechanic on a slot machine.

As shown in FIG. 2, upon entering a bet via the bet icon 153, a user can begin a round of play by pressing or selecting the spin icon 155 (step 201). In response, the computer processor emulates the spin of a set of virtual slot machine wheels (101-105), and instructs a display device to display a matrix of symbols showing the landing position of the virtual wheels. This can be done, e.g., by displaying a sequence of symbols (not shown) on a payout line (130), as well as sequences of symbols on one or more lines (120, 140) other than the payout line. If the sequence of symbols (not shown) displayed on the payout line 130 matches a payout sequence (step 205, yes branch), the processor can determine the payout, instruct the display to display the payout in the win icon 154, increment the credit balance by the payout and instruct the display to display a new credit balance in the credit balance icon 152, and await additional user input from the touch screen display. The additional user input can take the form of selection of a new game, game option, or request to cash out via menu 151, a change in the game level via game level icon 150, a change in the bet amount via bet icon 153, or selection of a new spin via spin icon 155.

If the sequence of symbols (not shown) displayed on the payout line 130 does not match a payout sequence (step 205, no branch), the processor can generate and briefly display to the user a pattern matching sequence (step 210). The pattern matching sequence can be displayed to the user through one or more indicators that alert the user to particular cells in the displayed matrix of symbols. Cell indicators can include, but are not limited to, flashing the symbols that are displayed in the cells on and off, making the cells brighter and dimmer, flashing or highlighting the cell borders in a given color such as a bright purple, superimposing a numbered or lettered sequence over the cell symbols, or combinations of the above. Cell indicators can also include highlighting the cells in the pattern matching sequence to give them the appearance of depressed buttons. Different colors can be used to highlight cells based on their row or column or both to help the user to remember the pattern. For example, cells in row 1 could be highlighted in green, cells in row 2 could be highlighted in purple, and so on. Cell indicators can also include, but are not limited to audio cues to help the user remember the pattern matching sequence. Different audio cues (e.g., tones of different pitch) can be assigned to cells in the pattern matching sequence based on the cell row, cell column, or both. For example, FIG. 1A shows a particular pattern matching sequence consisting of cells 121, 132, 143, 144 and 125. The sequence is displayed to the user through two cell indicators—the highlighting of cell borders and the superposition of a numbered sequence (1, 2, 3, 4 and 5) over the symbols (not shown) displayed in the cells.

After having been presented with the pattern matching sequence, the user is given a first predetermined time (e.g., five seconds) to begin trying to match the sequence and a second predetermined time (e.g., ten seconds) by which to finish trying to match the sequence. The user can match the pattern matching sequence by correctly touching or selecting, in the correct order, all of the cells in the displayed matrix of symbols that were previously highlighted by cell indicators. For example, in FIG. 1A, the pattern to be matched is the sequence of cells 121, 132, 143, 144 and 125, the sequence having been previously displayed to the user by temporarily highlighting each of the cells in the sequence with the respective numbers 1, 2, 3, 4 and 5. The user can match the pattern by selecting in sequence cells 121, 132, 143, 144 and 125.

In some implementations, the pattern matching sequence displayed to the user can get progressively harder as the user shows greater proficiency in matching the sequence. The level of difficulty can be increased in various ways, for example, by increasing the number of cells in the pattern matching sequence, randomizing the order in which cells are presented in the pattern matching sequence, or introducing a cadence to the pattern matching sequence and requiring the user to match the cadence within some level of error. The level of difficulty can be displayed in a graphical manner, for example in a meter 110 graphically presented on one or both sides of the display. Alternatively, or additionally, the level of difficulty can be numerically displayed in an icon such as level icon 150.

Figure 1B:
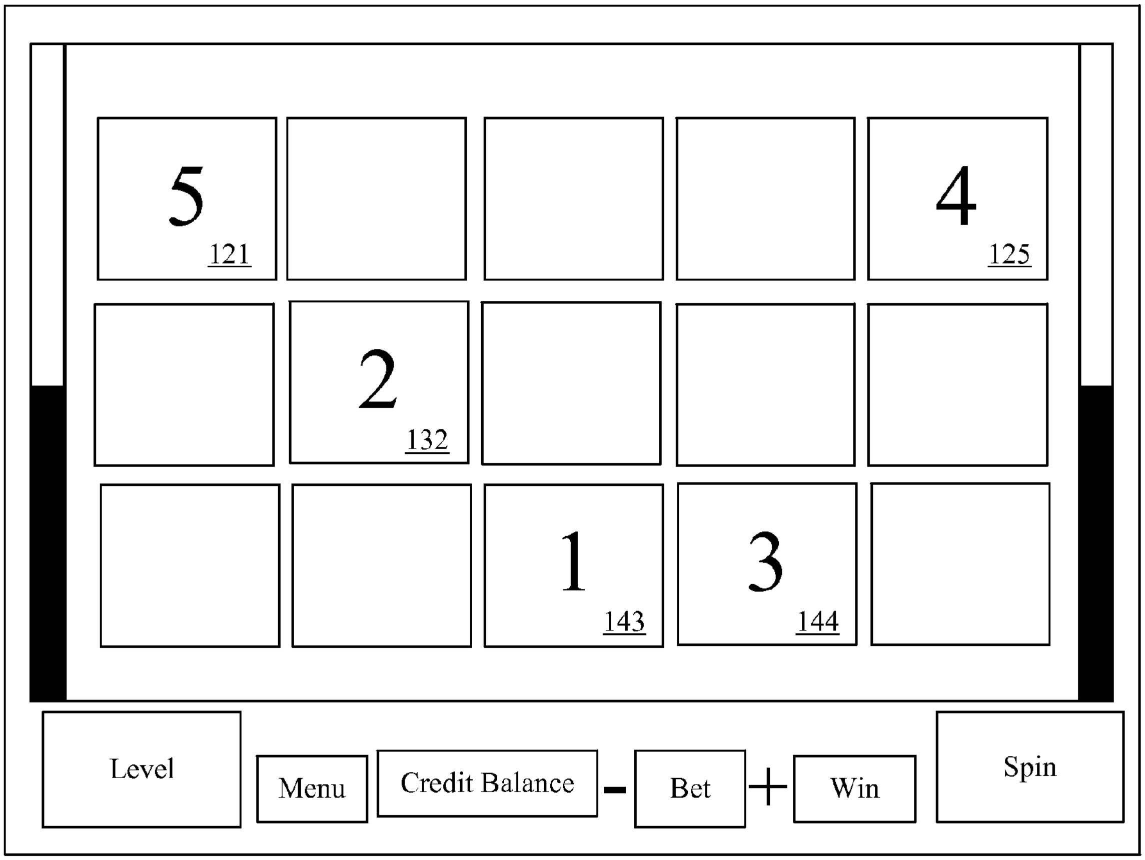
FIG. 1B is an illustration of a touch screen display on a slot machine showing a second aspect of a pattern matching mechanic.

An initial, or base level pattern matching sequence can be similar to the one shown in FIG. 1A, i.e., limited to one randomly chosen cell per column of the displayed symbol matrix (e.g., cell 121 in column 101), such that the randomly chosen cells are highlighted in order from the left most column 101 to the right most column 105. As the user gets proficient in matching such patterns, the level of difficulty can be increased by randomizing the order in which the randomly selected cells for each column are highlighted. For example, as shown in FIG. 1B, a more difficult pattern matching sequence can be formed from the same cells that made up the pattern matching sequence shown in FIG. 1A by randomizing the order in which the cells are highlighted. Thus, as indicated by the cell indicators 1, 2, 3, 4 and 5, the new pattern matching sequence shown in FIG. 1B consists of the highlighted cells 143, 132, 144, 125 and 121. To match the pattern, the user must select these cells in the order in which they have been highlighted.

Figure 1C:
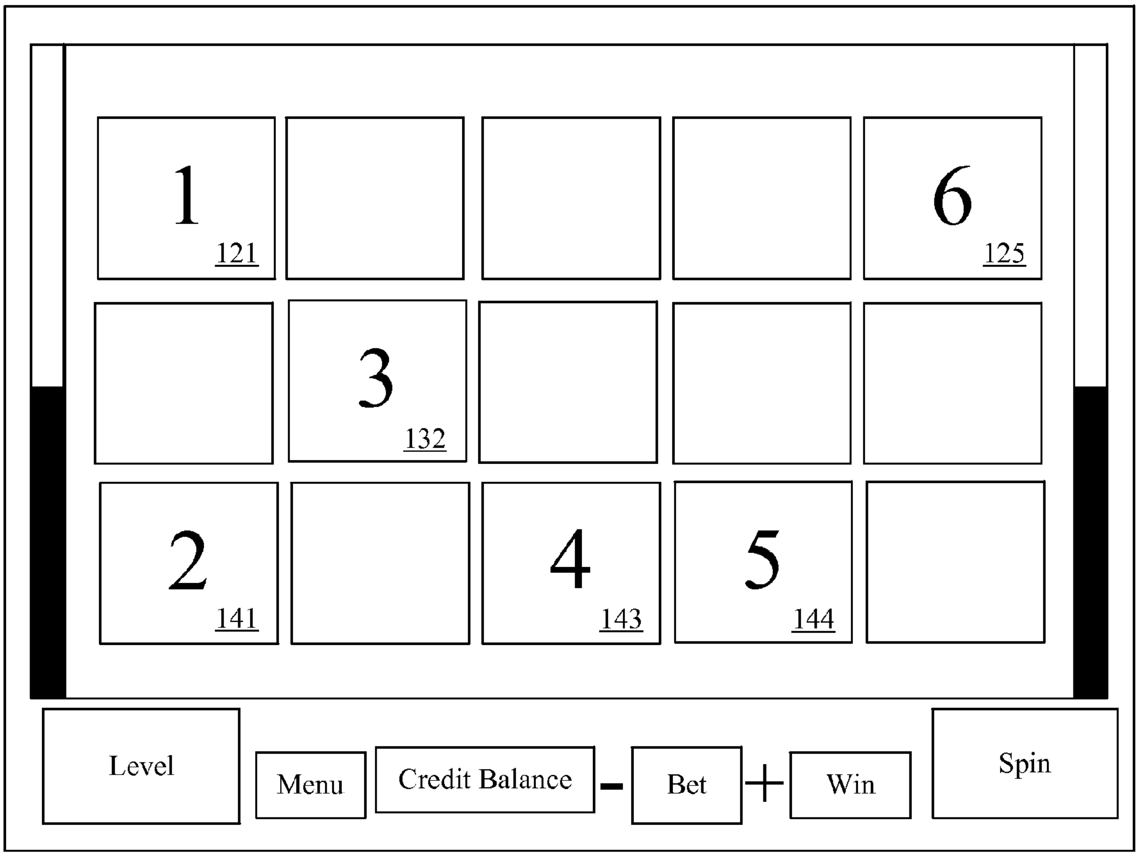
FIG. 1C is an illustration of a touch screen display on a slot machine showing a third aspect of a pattern matching mechanic.

Additional ways of increasing the difficulty level of the pattern matching mechanic are possible. For example, the amount of time during which each cell in the pattern matching sequence is displayed to the user via the cell indicators can be reduced at higher levels. Initially, the cell cells in the sequence can be highlighted for 0.5 seconds. This can be subsequently reduced to, for example, 0.4, 0.3 or 0.2 seconds. In addition, two or more randomly chosen cells can be highlighted in one or more columns of the displayed symbol matrix. This allows several gradations in increasing the level of difficulty of the pattern matching mechanic. For example, as shown in FIG. 1C, initially two randomly selected cells can be highlighted in the first column of the displayed symbol matrix but not the other columns. The two cells in the first column can be highlighted for the same amount of time as the single cells in the other columns, or can each be highlighted for half the time to further increase the level of difficulty. Next, two randomly selected cells from the first two columns can be highlighted, two cells from the first three columns, and so on. To further increase the level of difficulty, the order in which the randomly selected cells in each column are presented can be varied as before. Thus, the randomly selected cells (one, two or more) per column can initially be highlighted in columnar order, e.g., from leftmost column to rightmost column. Subsequently, however, the randomly selected cells per column can be highlighted in a random columnar order, such as highlighting cells in columns 103, 105, 102, 101 and then 104. Other, random, columnar orders are of course possible.

Yet another way to increase the level of difficulty of the pattern matching mechanic is to introduce a cadence into the pattern matching sequence, and require the user to match not only the pattern but the cadence. For example, a cadence can be introduced into the pattern matching sequence shown in FIG. 1A so that when it is revealed to a user, cell 121 is highlighted for a first period of time (e.g., 0.5 seconds), cells 132 and 143 are each highlighted for a second period of time (e.g., 0.25 seconds), cell 144 is highlighted for the first period of time and cell 125 is highlighted for the second period of time. To correctly match the pattern, the user would not only have to select or touch the correct sequence of cells, but the correct sequence of cells for the correct amount of time. Thus, the user would fail to match the pattern matching sequence described above, even if the user ultimately selected the correct sequence of cells, if the user selected cell 132 for the first period of time rather than the required second period of time. Of course, more than two periods of time can be employed, further increasing the level of difficulty in the pattern matching mechanic.

Returning now to FIG. 2, if the user fails to match the pattern matching sequence (step 220, no branch)—either by waiting too long to begin trying to match the sequence, taking too long to match the sequence, or entering an incorrect sequence or cadence, a counter which records the number of consecutive failures is incremented. If the counter exceeds a threshold (step 225, yes branch), the processor reduces the difficulty level of the pattern matching sequence (step 250) so that subsequently generated sequences will be easier for the user to match. The failure threshold can be set by design or user preference. In one implementation, the level of difficulty is reduced whenever the user fails to match two consecutive pattern matching sequences. Other thresholds are, of course, possible. Regardless of whether the difficulty level is reduced (step 230) or not reduced because the user did not exceed the failure threshold (step 225, no branch), the processor awaits further user input. As before, this further input can take the form of selection of a new game, game option, or request to cash out via menu 151, a change in the game level via game level icon 150, a change in the bet amount via bet icon 153, or selection of a new spin via spin icon 155 (step 201).

During play, while the user is selecting cells in an attempt to match the previously displayed pattern matching sequence, various cues such as visual and auditory cues can be provided to indicate the user's progress. For example, when the user selects a correct cell (in both sequence and cadence, if applied) the cell can be highlighted to indicate the correct selection. Correctly selected cells can be highlighted, for example, by flashing them on and off, alternating their luminance between dim and bright, or flashing or highlighting their borders a certain color such as green. Correctly selected cells can also be highlighted to appear as depressed buttons. In one implementation different colors can be assigned to cells in different rows or columns, or both. For example, selected cells in row 1 could be highlighted in green, while those in row 2 could be highlighted in purple, and so on. In addition, audio cues can be provided such as producing a pleasant and ascending sound effect as more and more cells in the pattern matching sequence are correctly selected. Like the visual cues, different audio cues can be assigned based on a selected cell's row or column, or both. If the user ever selects an incorrect cell, different visual and audio cues can be provided. For example, the border of the incorrectly selected cell can be flashed or highlighted red, can be enlarged relative to the borders of neighboring cells, and a negative audio cue such as a sad trombone can be provided.

Referring back to FIG. 2, if the user correctly selects all the cells in the previously displayed pattern matching sequence (step 220, yes branch), the user is presented with an award or bonus (step 235). In addition, a counter indicating the number of consecutively matched pattern matching sequences is incremented. If the counter exceeds a threshold (step 240, yes branch), the difficulty level of the pattern matching sequence is increased (step 245). The success threshold can be set by design or user preference. In one implementation, the difficulty level is raised whenever the user matches three consecutive pattern matching sequences. Other thresholds are, of course, possible. In this way, users who become proficient at matching pattern matching sequences generated at a given level of play can be challenged to match a more difficult pattern matching sequence generated at a higher level of play the next time the pattern matching mechanic is invoked. The play levels can be incremented until a maximum play level is achieved. The current level of play can be numerically displayed in the level icon 150 or graphically displayed in the level meter 110. Regardless of whether the difficulty level is increased (step 245) or not increased because the user did not exceed the success threshold (step 240, no branch), the processor awaits further user input. As before, this further input can take the form of selection of a new game, game option, or request to cash out via menu 151, a change in the game level via game level icon 150, a change in the bet amount via bet icon 153, or selection of a new spin via spin icon 155 (step 201).

Different types of reward or bonus can be offered to the user when the user successfully matches a presented pattern matching sequence. Moreover, better or larger rewards can be offered for matching more difficult pattern matching sequences presented in higher levels of play. Offered rewards can include, but are not limited to, casino style perks for time spent playing the machine or enhancement of such perks if they are already offered, credits for extra playing time on the machine, free spin(s), bonus points or increases in experience level on games or non-gambling machines, an improvement in the pay table or a multiplier to the pay table provided by gambling machines, eligibility to a random bonus drawing for one or more rewards, or some combination of these. Examples of the advantageous conferred by such rewards are described below.

The slot machine can be provided with different game mechanics or the pattern matching mechanic can be provided with different levels. Some of these game mechanics or pattern matching mechanics can be locked until a user achieves a certain level of skill or experience. Thus, by increasing the users experience level upon matching a given pattern matching sequence, various games or additional levels of play may be made available to the user.

The slot machine may also be provided with multiple pay tables, where each pay table identifies particular sequences of symbols that will payout if they appear on the payout line and their payout amounts, and is constructed so that over a sufficiently large number of spins the slot machine will payout a given percentage of the its receipts. Thus, a slot machine can have pay tables that return 80% of receipts, 85% of receipts, or 90% of receipts. When a user successfully matches a number of patterns, she can be switched from the 80% pay table to the 85% pay table, thereby increasing her odds of winning on the next spin. Moreover, if the user loses the next spin, but successfully matches the pattern matching sequence provided, the user can be switched from the 85% pay table to the 90% pay table, further increasing the user's odds of winning on the next spin. In this way, users can be encouraged to continue playing on the machine.

Another reward that could be offered to users who match the pattern matching sequence is to provide the users with a second chance to match a payout sequence on the payout line. In this reward, one or more cells in one or more columns of the displayed symbol matrix are randomly selected and deleted. The cells that are directly above the one or more deleted cells in the one or more columns of the displayed symbol matrix are subsequently dropped down to fill the spaces vacated by the one or more deleted cells. As a result, a new symbol sequence may be presented on the payout line. If this new symbol sequence matches a payout sequence in the machine's pay table, the bet can be paid off, thereby transforming an initially losing bet into a winning bet.

As discussed above, the slot machine mechanic can have adjustable levels of play, where more difficult pattern matching sequences are generated at higher levels of play. Pattern matching sequences can be made more difficult by increasing the number of cells in the pattern matching sequence, randomizing the order in which cells in the pattern matching sequence are highlighted, introducing a cadence to the pattern matching sequence, or reducing the time during which the cells in the pattern matching sequence are highlighted. Moreover, different types or sizes of reward can be presented to the user depending on the level of play at which a pattern matching sequence is matched. In some embodiments, the reward may only be offered when the user reaches a certain level of play, or only when the user remains at a certain level of play for more than a predetermined number of spins.

An exemplary illustration of the number of levels of play for a pattern matching mechanic implemented in a slot machine having three rows and five columns (virtual wheels) is presented below in Table 1, together with a description of the pattern matching sequences generated at each level, and the nature of the reward offered for matching the described pattern matching sequences.

TABLE 1

| Level | Pattern Matching Sequence | Presentation Order | Bonus Level |
|---|---|---|---|
| 1 | 1 cell in cols. 1-5 | L to R | None |
| 2 | 1 cell in cols. 1-5 | Random | None |
| 3 | 2 cells in col. 1; 1 cell in cols. 2-5 | L to R | Tier 1 |
| 4 | 2 cells in cols. 1-2; 1 cell in cols. 3-5 | L to R | Tier 1 |
| 5 | 2 cells in cols. 1-3; 1 cell in cols. 4-5 | L to R | Tier 1 |
| 6 | 2 cells in cols. 1-4; 1 cell in col. 5 | L to R | Tier 1 |
| 7 | 2 cells in cols. 1-5 | L to R | Tier 1 |
| 8 | 2 cells in cols. 1-5 | Random | Tier 2 |
| 9 | 3 cells in col. 1; 2 cell in cols. 2-5 | L to R | Tier 3 |
| 10 | 3 cells in cols. 1-2; 2 cell in cols. 3-5 | L to R | Tier 3 |
| 11 | 3 cells in cols. 1-3; 2 cell in cols. 4-5 | L to R | Tier 3 |
| 12 | 3 cells in cols. 1-4; 2 cell in col. 5 | L to R | Tier 3 |
| 13 | 3 cells in cols. 1-5 | L to R | Tier 3 |
| 14 | 3 cells in cols. 1-5 | Random | Tier 4 |

As shown in Table 1, in the 1$^{st}$ level of play, the pattern matching mechanic randomly selects a single cell in each of the columns, and highlights the selected cells in order from the leftmost to the rightmost column. No bonus is rewarded for matching the pattern. In the 2$^{nd}$ level of play, the pattern matching mechanic randomly selects a single cell in each of the columns, and highlights the selected cells in a random columnar order. Again, no bonus is rewarded for matching the pattern. In the 3$^{rd}$ level of play, the pattern matching mechanic randomly selects two cells in the first column and a single cell in each of the remaining columns, and highlights the selected cells in order from the leftmost to the rightmost column. A Tier 1 bonus is rewarded for matching the pattern. The Tier 1 bonus can be, for example, casino comps for time spent playing the machine or an enhancement of such comps. In the 4$^{th}$ through 7$^{th}$ levels of play, two cells are randomly selected for more and more columns so that by the 7$^{th}$ level of play two cells are randomly selected for all five columns. The selected cells are highlighted in order from the leftmost to the rightmost column, and the Tier 1 bonus is rewarded for matching the pattern. In the 8$^{th}$ level of play, two cells are randomly selected for all five columns, however they are highlighted in random columnar order. A Tier 2 bonus is rewarded for matching the pattern. The Tier 2 bonus can be, for example, a credit for a free spin on the machine or a second chance to win on the spin by randomly deleting one or more cells and allowing the remaining cells to drop in place, thereby changing the symbol sequence on the payout line. In the 9$^{th}$ through 13$^{th}$ levels of play, the pattern matching mechanic randomly selects 3 cells in one or more of the columns, progressing from three cells in the 1$^{st}$ column in the 9$^{th}$ level of play to three cells in all five columns in the 13$^{th}$ level of play. The mechanic then highlights the selected cells in columnar order, from the leftmost column to the rightmost column. A Tier 3 bonus is rewarded for matching the pattern. The Tier 3 bonus can be, for example, changing the pay table from an 80% return-to-player table to an 85% return-to-player table, thus increasing the player's odds of winning on the next spin. Finally, at the 14$^{th}$ or highest level, the pattern matching mechanic randomly selects 3 cells in each of the five columns, and presents the cells in a randomly selected columnar order. A Tier 4 bonus is reward for matching the pattern. The Tier 4 bonus can be, for example, changing the pay table from an 85% return-to-player table to a 90% return-to-player table, further increasing the player's odds of winning on the next spin.

While the slot machine mechanic has been described as being invoked only after a losing spin, the mechanic can also be invoked only after a winning spin, or after every spin. Thus, for example, in certain embodiments the mechanic can be invoked when the payout line matches a payout sequence. This can be done to enhance the payout amount, provide additional winnings (e.g., bonus comp time) or to change the pay table to increase the payout on the current spin or the odds of winning on the next spin. Thus, in different embodiments, the slot machine mechanic can be invoked only when the payout line matches a payout sequence, only when the payout line does not match a payout sequence (as described in FIG. 2), or on every spin, regardless of whether the payout line matches the payout sequence.

Figure 3:
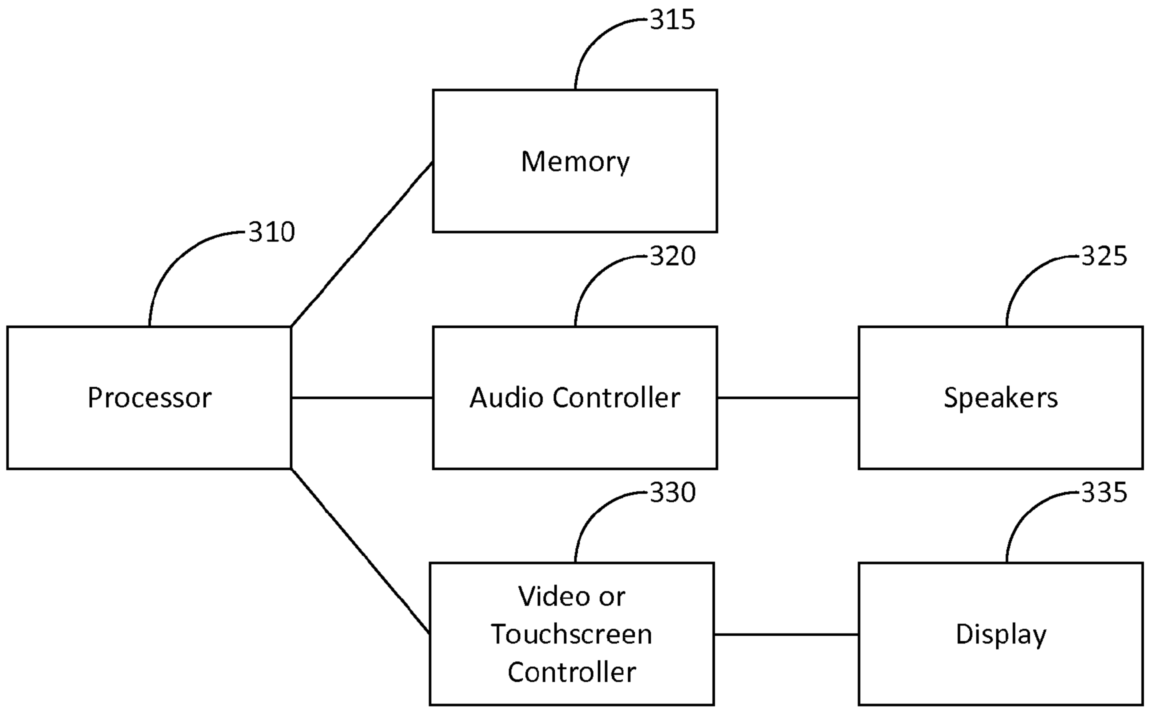
FIG. 3 is an illustration of an electronic slot machine configured to implement a pattern matching mechanic.

FIG. 3 is an illustration of an electronic slot machine 300 configured to implement a game mechanic such as the pattern matching mechanic 200 of FIG. 2. The electronic slot machine 300 includes at least one processor 310 configured to execute computer instructions stored on at least one memory device 315. The stored computer instructions control the action of the electronic slot machine and can include instructions to implement one or more random number generators, various game mechanics for generating a virtual slot machine, and a pattern matching game mechanic 200 as shown in FIG. 2. The memory device 315 can also store data useful to implementing the action of the slot machine such as images of symbols used during play, one or more pay-tables, and one or more tables identifying the levels of play, pattern generation rules, and reward categories for a pattern matching mechanic. The memory device 315 can be implemented in random access memory, read only memory, flash memory and/or electrically erasable programmable read only memory, among others. Part or all of the computer instructions or data can be downloaded to the memory device 315 through a suitable network or other I/O interface to the electronic slot machine 300.

The electronic slot machine 300 can include a display device 335 in communication with the processor 310 via a video or touch-screen controller 330. The display device 335 is preferably a touch-screen device that can both display information upon instruction from processor 310 and receive and send user input to processor 310 during the play of the game. Such user input can include bet amounts, play levels, spins, and attempted pattern matching sequences. Non-touch-screen displays can be used, however, when such display devices are used other I/O elements, such as keyboards, keypads, trackballs, mice, and/or one or more user selectable levers or buttons must be included to allow processor 310 to receive and process user input.

The electronic slot machine 300 can also include one or more speakers 325 in communication with the processor 310 via an audio controller 320. Various audio cues such as ascending scales or sad trombones can be played through the speakers to indicate a player's success or failure during play of the game. In one implementation, the electronic slot machine 300 includes at least one I/O device (not shown) for accepting user payments. The payment acceptor device can be a coin slot, a bill or note acceptor, a credit or debit card reader, a smart or identification card reader, or combinations of the above.

The electronic slot machine described herein can be configured to be operated as a standalone slot machine, a gaming or gambling machine, or a video game played on a computing device such as a desktop or laptop computer, a tablet computer, or a smart phone. The computer device can be operated as a standalone device or as a client in communication with a server over a communications network such as a wired or wireless network, a cellular network or a satellite network.

Embodiments of the subject matter described can be implemented in digital electronic circuitry, or in computer hardware, firmware, software, or in combinations of the same. Embodiments can also be implemented as one or more computer program products, i.e., one or more computer program instructions encoded on a computer-readable medium for execution by a programmable processor. Suitable programmable processors include, but are not limited to, single or multiple computer processors, controllers, digital signal processors, graphical processing units, and other special and general purpose processors. The processor can receive instructions and data from a memory, such as a read-only memory or a random access memory or both, can manipulate the data according to the computer instructions, and can write data to memory such as random access memory or a mass storage device such as a magnetic, magneto-optical, or optical disk.

The computer program instructions can be written in any form of programming language, including compiled or interpreted languages, and can be deployed in any form, including as stand-alone instructions or in a module, component, subroutine, or other unit suitable for use in a computing environment. The computer program instructions can be executed on one computer located at one site or on multiple computers that are distributed across multiple sites and interconnected by a communication network. Computer-readable media suitable for storing the computer program instructions can include all forms of non-volatile memory and memory devices, including EPROM, EEPROM, and flash memory devices; magnetic, magneto-optical, and optical disks; CD-ROM and DVD-ROM disks.

To provide for user interaction, embodiments disclosed can be implemented on computers having display devices (e.g., touch screen, LED or LCD displays) to display information to the user, and/or keyboards or pointing devices (e.g., mice, stylus' or trackballs) to receive input from the user. Other types of devices can be employed to provide for interaction with the user such as speakers to provide audio output, microphones to receive audio input, and capacitive touch screen devices to receive tactile input from the user.

Embodiments of the subject matter described in this specification can be implemented in computing systems that include back-end components (e.g., data servers), middleware components (e.g., application servers), or front-end components (e.g., client computers), or any combination of the same. The components can be interconnected by one or more communication networks, such as local, wide area, wireless, cellular, and/or satellite networks.

Particular embodiments of the invention have been described. Other embodiments are within the scope of the following claims. For example, the actions recited in the claims can be performed in a different order and still achieve desirable results. In the following discussion and in the claims, the terms "including" and "comprising" are used in an open-ended fashion, and thus should be interpreted to mean "including, but not limited to . . . . " To the extent that any term is not specially defined in this specification, the intent is that the term be given its plain and ordinary meaning. The accompanying drawings are intended to aid in understanding the present invention and, unless otherwise indicated, are not drawn to scale.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim:

1. A computer implemented method for providing a pattern matching mechanic on a slot machine, comprising:

determining that a spin of the slot machine has ended;

displaying a pattern matching sequence to a player of the slot machine, the pattern matching sequence corresponding to a random sequence of cells in a symbol matrix displayed on a display device of the slot machine;

receiving a player generated input sequence, the player generated input sequence corresponding to a sequence of cells in the symbol matrix selected by the player;

determining whether the player generated input sequence matches the pattern matching sequence; and providing the player with a reward if the player generated input sequence matches the pattern matching sequence;

wherein the pattern matching sequence further comprises a cadence for the pattern matching sequence; and wherein displaying the pattern matching sequence further comprises displaying the pattern matching sequence according to the cadence for the pattern matching sequence;

wherein receiving a player generated input sequence further comprises measuring the cadence of the received player generated input sequence; and wherein determining whether the player generated input sequence matches the displayed pattern matching sequence further comprises determining whether the cadence of the player generated input sequence matches the cadence of the pattern matching sequence.

2. A computer implemented method for providing a pattern matching mechanic on a slot machine, comprising:

determining that a spin of the slot machine has ended;

displaying a pattern matching sequence to a player of the slot machine, the pattern matching sequence corresponding to a random sequence of cells in a symbol matrix displayed on a display device of the slot machine;

receiving a player generated input sequence, the player generated input sequence corresponding to a sequence of cells in the symbol matrix selected by the player;

determining whether the player generated input sequence matches the pattern matching sequence; and providing the player with a reward if the player generated input sequence matches the pattern matching sequence;

further comprising generating the pattern matching sequence according to a level of play; and further comprising decreasing the level of play if the player generated input sequence does not match the pattern matching sequence.

3. The computer implemented method of claim 2, wherein decreasing the level of play if the player generated input sequence does not match the pattern matching sequence further comprises:

determining a consecutive number of failed plays in which the player generated input sequence did not match the pattern matching sequence;

comparing the consecutive number of failed plays to a first play threshold; and decreasing the level of play if the consecutive number of failed plays is greater than the first play threshold.

4. A computer implemented method for providing a pattern matching mechanic on a slot machine, comprising:

determining that a spin of the slot machine has ended;

displaying a pattern matching sequence to a player of the slot machine, the pattern matching sequence corresponding to a random sequence of cells in a symbol matrix displayed on a display device of the slot machine;

receiving a player generated input sequence, the player generated input sequence corresponding to a sequence of cells in the symbol matrix selected by the player;

determining whether the player generated input sequence matches the pattern matching sequence; and providing the player with a reward if the player generated input sequence matches the pattern matching sequence;

wherein providing the player with a reward if the player generated input sequence matches the pattern matching sequence further comprises:

deleting a cell from the displayed symbol matrix;

moving a cell immediately above the deleted cell down in the displayed symbol matrix to generate a new symbol matrix, the moved cell including a symbol that moves with the cell;

determining whether a sequence of symbols in the new symbol matrix matches a payout sequence in the pay table of the slot machine; and paying a bet wagered on the spin of the slot machine if the sequence of symbols in the new symbol matrix matches a payout sequence in the pay table.

* * * * *